United States Patent

Cohan

[11] Patent Number: 5,653,872
[45] Date of Patent: Aug. 5, 1997

[54] APPARATUS FOR REMOVING WATER FROM AQUEOUS SLUDGE WASTE COMPOSITIONS

[76] Inventor: Allan N. Cohan, 2304 Highway 11 South, Meridian, Miss. 39307

[21] Appl. No.: 443,768

[22] Filed: May 18, 1995

Related U.S. Application Data

[60] Division of Ser. No. 218,948, Mar. 29, 1994, which is a continuation-in-part of Ser. No. 70,532, Jun. 3, 1993, abandoned.

[51] Int. Cl.[6] ............. C02F 11/12; F26B 17/00; F26B 21/00
[52] U.S. Cl. ............. 210/252; 210/175; 210/219; 210/259
[58] Field of Search ............. 210/175, 173, 210/198.1, 219, 252, 257.1, 259; 34/57 R, 57 A, 201

[56] References Cited

U.S. PATENT DOCUMENTS

| | | | |
|---|---|---|---|
| Re. 33,998 | 7/1992 | Hampton | 210/770 |
| 2,163,556 | 6/1939 | Glaze . | |
| 2,439,384 | 4/1948 | Fetzer . | |
| 2,877,599 | 3/1959 | Hebestreet et al. . | |
| 3,161,483 | 12/1964 | Morris . | |
| 3,225,685 | 12/1965 | King et al. . | |
| 3,873,734 | 3/1975 | Higgins et al. | 71/11 |
| 3,905,796 | 9/1975 | Ghelfi | 71/21 |
| 3,950,562 | 4/1976 | Senior | 71/21 |
| 4,082,532 | 4/1978 | Imhof | 71/21 |
| 4,099,336 | 7/1978 | Maffet | 71/12 |
| 4,161,825 | 7/1979 | Maffet | 71/12 |
| 4,180,593 | 12/1979 | Cohan | 34/10 |
| 4,193,206 | 3/1980 | Maffet | 34/12 |
| 4,330,411 | 5/1982 | Florin et al. | 34/22 |
| 4,419,834 | 12/1983 | Scott | 34/57 A |
| 4,663,225 | 5/1987 | Farley et al. | 428/290 |
| 4,813,996 | 3/1989 | Gardner et al. | 71/21 |
| 5,069,801 | 12/1991 | Girovich | 210/770 |
| 5,161,315 | 11/1992 | Long | 34/57 D |
| 5,207,904 | 5/1993 | Abel | 210/259 |
| 5,215,670 | 6/1993 | Girovich | 210/770 |
| 5,238,399 | 8/1993 | Long | 432/59 |
| 5,279,637 | 1/1994 | Lynam et al. | 210/770 |
| 5,283,959 | 2/1994 | Nagayoshi et al. | 34/57 R |

FOREIGN PATENT DOCUMENTS 55-148266  11/1980  Japan .
835216  5/1960  United Kingdom .

OTHER PUBLICATIONS

JET-PRO High Temperature Air Dryers, Fishbaugh Construction Company, Greenwhich, Ohio (Brochure) (undated).

*Primary Examiner*—John Kim
*Attorney, Agent, or Firm*—Pollock, Vande Sande & Priddy

[57] ABSTRACT

Process for producing free-flowing solid material from an aqueous sludge waste composition that includes mixing the sludge with previously dried solids, pelletizing the composition to form strand-like material, drying the outside layer of the strand-like material, and drying the partially dried material by contacting with heated gas.

3 Claims, 2 Drawing Sheets ical scale, and is consistently reliable. The present invention provides a
APPARATUS FOR REMOVING WATER FROM AQUEOUS SLUDGE WASTE COMPOSITIONS

CROSS-REFERENCES TO RELATED APPLICATIONS

This is a divisional application of Ser. No. 08/218,948, filed on Mar. 29, 1994, which in turn is a continuation in part of U.S. patent application Ser. No. 08/070,532, filed Jun. 3, 1993 and now abandoned.

DESCRIPTION

TECHNICAL FIELD

The present invention is concerned with a process for removing water from aqueous waste compositions to produce free-flowing solid materials.

The process of the present invention is especially advantageous in treating aqueous sludge waste to provide usable fertilizer compositions.

BACKGROUND OF THE INVENTION

A major waste management problem involves disposal of sewage sludge. The problems concerning disposal of sewage sludge have existed for a considerable period of time. Attempts to remove the water from sewage sludge have not been especially satisfactory. For instance, it is extremely difficult to reduce the water content of sewage sludge below about 85%, such as by mechanical methods such as centrifuges, belt presses and screens. Moreover, methods that employ evaporation by heating have not been particularly attractive from a commercial viewpoint, because of the relatively large energy requirements.

SUMMARY OF THE INVENTION

The present invention is concerned with providing a method useful for treating aqueous sludge waste that is relatively easy to implement on an industrial scale, and is consistently reliable. The present invention provides a method for producing a free-flowing material from the solids present in the sludge waste. A further advantage of the present invention is that free-flowing materials produced in accordance with the present invention find use in fertilizer compositions and as an organic supplement for soils. Moreover, the present invention makes it possible to prepare materials that are relatively safe to handle.

In accordance with the present invention, a method is provided for producing free-flowing solid material from an aqueous sludge waste composition. The method includes providing a slurry of the aqueous sludge waste composition containing about 1% to about 28% by weight of solids; and adding dried solids from a sludge waste composition.

The composition is then subjected to pelletization to thereby provide the material in the form of strands. The outer layer of the strands is then dried by subjecting the strands to elevated temperatures. The partially dried strands are then conveyed to a drying zone. The temperature in the drying zone is typically about 350° to about 750° F., but can be lower, such as about 300° to about 350°. The partially dried strands are contacted with heated gas, preferably air, that flows up through the strands to remove water as a vapor from the strands. The dried strands are retained in the drying zone for a long enough period of time to pasteurize and form free-flowing solid materials. The free-flowing solid materials are separated from the gases and water vapor.

The present invention provides an effective and efficient method for separating solids from sewage sludge. Furthermore, the present invention provides solid materials that can be put to valuable use as fertilizers and soil conditioners as a natural and safe recycled pasteurized bioorganic.

BEST AND VARIOUS MODES FOR CARRYING OUT INVENTION

Figure 1:
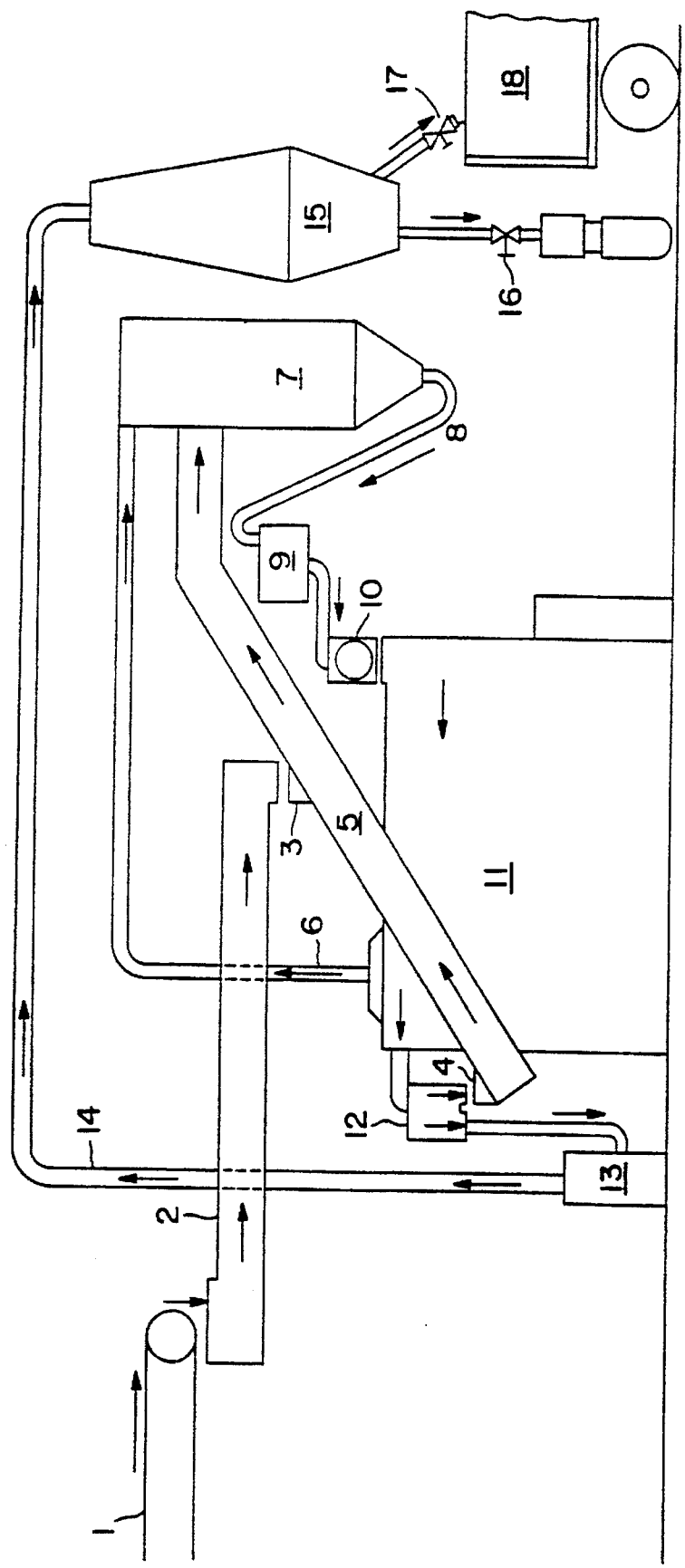
FIG. 1 is a schematic diagram of apparatus suitable for handling sewage sludge compositions pursuant to the present invention.
Figure 3:
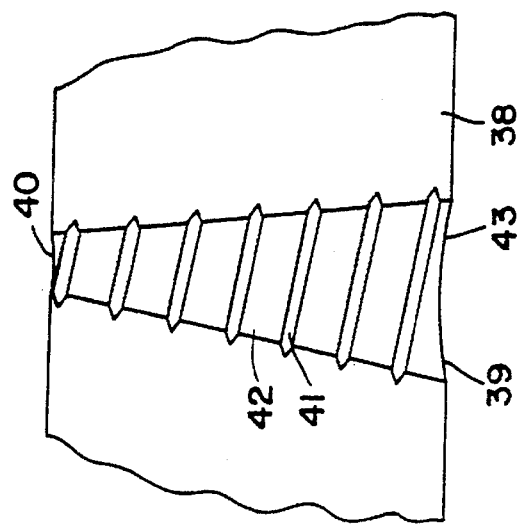
FIG. 3 is an enlarged cut away of the plate 38 of FIG. 2.

The aqueous composition to be treated in accordance with the present invention is aqueous sewage sludge which may be a digested sludge or a crude undigested sludge. Sludge compositions are typically in a form that is very difficult to handle and further process. In particular, such are very tacky and sticky.

The sewage sludge compositions processed according to the present invention are generally pretreated to mechanically remove as much water as possible, such as by a press and/or centrifuge. Even so, the solids content after such pretreatment is about 1% to about 28%, and more typically about 1% to about 18% and even more typically, about 12% to about 15% by weight of sludge solids.

The sewage sludge compositions to be treated pursuant tot he present invention are admixed with solid material that has previously been dried and obtained from sludge waste compositions. Typically, the amount of dried solids employed is such so as to provide a solids content of about 25% to about 50% by weight, and preferably about 30% to about 40% by weight in the aqueous composition.

According to preferred aspects of the present invention, the previously dried solid material is preblended with the sewage sludge by employing a screw conveyor. In particular, the previously dried material is added to the vicinity of the front end of the screw conveyor which is typically at least about 25 feet long, and is more typically at least about 35 feet long and rising from the front end upwardly at an angle of about 27° to about 38° and preferably about 35°. The sewage sludge is subsequently added to the screw conveyor at a location about 30% to about 70% and preferably about 40% to about 60% of its length up from the front end of the screw conveyor. The sludge and predried solid will premix with each other as the material is conveyed upwardly along the screw conveyor to thereby provide a material having a consistency that it can be readily handled in the subsequent processing. Previously dried material refers to material that typically has up to about 10% by weight of mixture, and more typically up to about 8% by weight of moisture.

In addition, it is preferred that the pH of the compositions subjected to the process of the present invention be about 6.7 to about 6.9 to assure that any heavy metals present therein will be bound up and not leachable from the product. In the event the pH is more acidic, lime can be added to adjust the pH.

The composition is then subjected to pelletization to thereby provide the material in strand-like form, or spaghetti-like form. The pelletizer operates in a manner whereby the sewage sludge is pressed through a plate having orifices therein (e.g., like a meat grinder) to provide the desired configuration of the material. Typically, the diameter of the strand-like material exiting from the pelletizer is about 1/8" to about 1", and more typically, about 1/8" to about 1/2". As the material exits from the pelletizer, it is subjected to elevated temperatures to thereby dry at least the outer surface of the strand-like material, to prevent it from sticking together during the subsequent treatment. The thickness of the outer layer that is dried is not critical and can be determined by persons skilled in the art without undue experimentation after becoming aware of this application. Typically, the thickness is about as thick as an average fingernail. The heat supplied to the strand-like material is provided by the heat emanating from the front end of the drying zone.

The strand-like material exits the pelletizer and drops into the drying zone by gravity. The temperature of the drying zone is typically about 300° F. to about 750° F., more typically about 350° F. to about 750° F., and preferably, about 450° F. to about 550° F., and most preferably, about 475° F. to about 500° F. The drying zone employed is one that requires hot gas, preferably air, flowing at relatively high velocity, typically at least about 80,000 cubit feet/minute, upwardly through the strand-like material as it is conveyed along the drying zone. The hot gas usually maintains strand-like material in a suspended state somewhat above the plate of the dryer containing the orifices. The material is typically conveyed along the drying zone by a chain-type baffled conveyor belt. The hot gas removes the water as vapor from the strands, and the hot gas and gases are then directed to a cyclone whereby submicron solid particles are removed from the air and separated from the gas, which is then exited to the atmosphere as a clean effluent. The product is then taken off as dry material from the drying zone. The material is maintain within the drying zone, typically for about 5 to about 20 minutes, in order to form free-flowing solid materials. The material leaving the drying zone can then be conveyed, such as by a screw conveyor having means to provide for recycling a portion thereof back to be mixed with new, incoming sludge composition, and means for conveying the remaining portion to storage facilities for cooling and storage. Dried material is conveyed back by using a screw conveyor as discussed above.

After the materials in the storage facility have been cooled, they can then be conveyed to a location for bagging or other disposal. In addition, material can be conveyed from the storage facility to be mixed with the sludge.

The preferred free-flowing materials obtained pursuant to the present invention are suitable as fertilizer and have moisture content of only up to about 10 percent, and more usually only up to about 8% by weight. In addition, due to the time and temperatures to which the material has been subjected, such has been sterilized or pasteurized. For instance, the material being treated in many cases reaches temperatures of about 210° F. or above, and is typically at those temperatures for over 20 minutes.

In addition, if desired, the compositions of the present invention can contain other constituents, such as other soil enrichment additives employed in fertilizer in amounts effective for their intended purposes, such as phosphates, sulfates and potassium. The compositions can be tailored in this manner to provide specialized fertilizers for specific crops, such as corn, tomatoes, leafy vegetables, and citrus crops.

The process of the present invention may be carried out in equipment such as shown in FIG. 1. In particular, previously dried material is added to the vicinity of the front end 4 of screw conveyor 5. Screw conveyor 5 typically has a 9 inch screw and is at least about 25 feet long, and more typically at least about 35 feet long. It rises from its front end 25 upwardly at an angle of about 27° to about 37° and preferably about 35°. The top portion of the conveyor 5 is typically horizontal for feeding into blender 7. The aqueous sewage sludge is subsequently added to the screw conveyor 5 via screw conveyor 2 from a prior mechanical predrying treatment, such as a belt press 1 or centrifuge. The aqueous sewage sludge is typically added via conveyor 2 at a location of 3 of about 30% to about 70%, and preferably about 40% to about 60% of the length of the screw conveyor 5 up from the front end 4 of the screw conveyor. A specific example being about 15 feet from end 4.

The aqueous sludge composition and previously dried sludge material is then further mixed in a continuous blender 7 and then conveyed by, for example, an enclosed tubular screw conveyor (not shown) to forced fed pelletizer 9. The material exiting from pelletizer 9 is in the form of strand-like material or spaghetti-like material.

As the material exits from the pelletizer, it is conveyed to vessel 10 which contains hot air emanated from the front end of drier 11. The strand-like material is subjected to the elevated temperatures in vessel 10 to thereby dry at least the outer surface of the strand-like material.

The strand-like material is then conveyed by gravity into the input of the drier 11. The drying apparatus is preferably a "Jet-Pro" dryer 936-M2 from Jet-Pro Company, Springfield, Ohio. For typical plant capacities, it is desirable for the quantities treated as discussed below, but not necessary to employ two such dryers in series.

Figure 2:
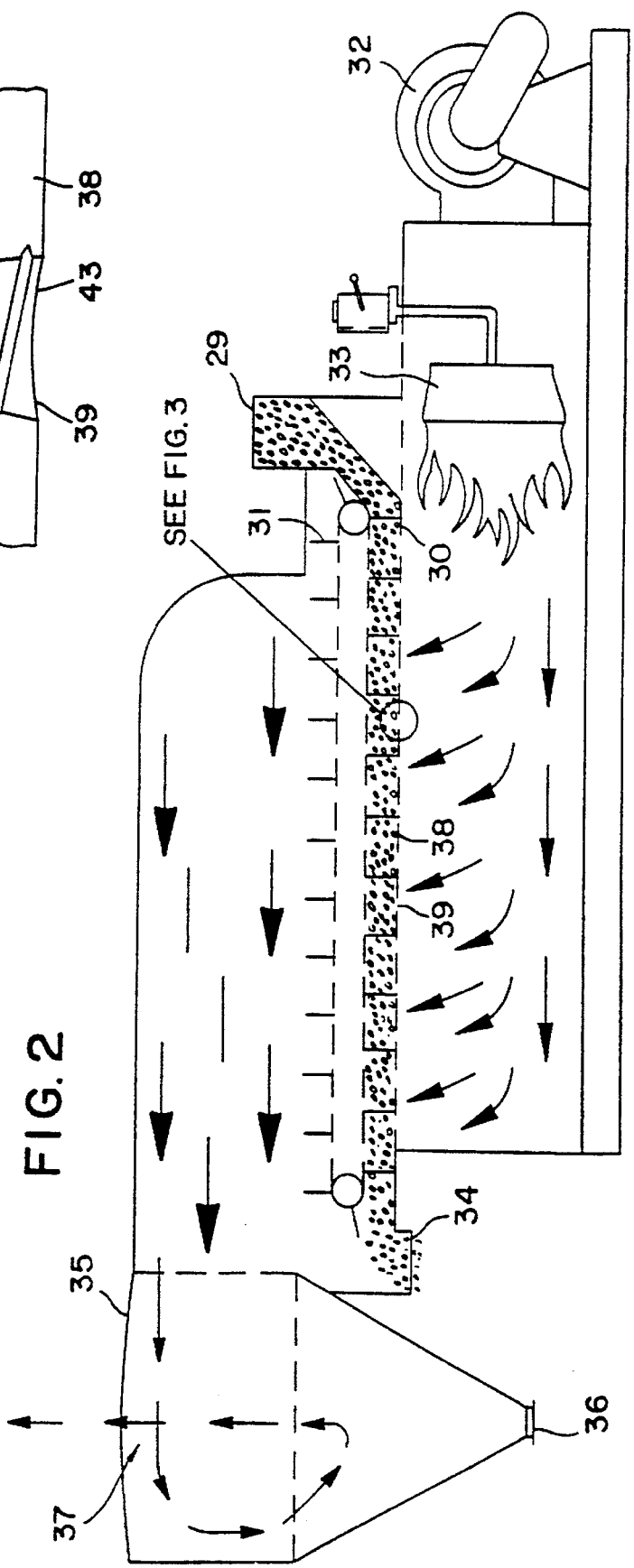
FIG. 2 is a schematic elevated diagram of a dryer that may be used pursuant to the present invention.

FIG. 2 is a schematic elevated diagram of a Jet Pro dryer. In particular, the composition to be dried is conveyed to the inlet 29, whereby it flows down by gravity to a chain type conveyor 30, having metal fingers, weirs, or baffles 31 that convey the material along the bottom of the dryer. Cool air is conveyed to the dryer by operation of fan 32, whereby it is heated by burner 33, and then the hot air is conveyed up through the material to be dried along the bottom surface of the conveyor.

The dryer can be a modified "Jet-Pro" dryer 936-M2 whereby the holes 39 in the plate thereof have screw thread-like peaks 42 and valleys 41. This configuration provides for a venturi-like effect of the hot gas flowing through the holes or orifices 39, and thereby causes spinning and swirling of the strand-like material to facilitate the drying. The thickness of the plate 38 is typically about 1/4 inch to about 2 inches. The holes 39 taper from lower opening 43 to upper opening 40. However, it is not necessary that the holes taper in order to achieve the above described venturi-like effect.

Heat can be supplied to burner 33 by using as heating fuel available methane, economically obtained from anaerobic digested sludge, propane, or natural gas. In a system designed to produce about nine tons per day of dried solids, about 10 million BTU's/hour of energy are used.

The product is then removed from port 34. In the case of dryers in series, the material is then conveyed to the inlet of a second dryer. Upon completion of exposure to the elevated temperatures and dryers, the exiting material which is now dried and free-flowing, is then conveyed to a holding bin 15, and/or to conveyor 5 for premixing with new incoming sludge.

The dried material, usually in the form of pellets or granules, is conveyed by a diverter or baffled screw conveyor 12 having valves (not shown), a discharge gate that permits material to flow to an air handling fan 13 that blows material into tank 15 via conduit 14 and a discharge gate that permits recycling of material to screw conveyor 5 in the vicinity of location 4 for premixing with aqueous sludge.

The hot air removes the water as vapors from the strand, and is then directed to a cyclone 35 (see FIG. 2), whereby solid particles are separated from the air. The solid particles are removed from port 36 of cyclone 35; whereas, the cleaned air is exhausted to the atmosphere, via the top port 37 of the cyclone. The solids removed from port 36 are conveyed, such as by a bucket-type conveyor or blowing, and recycled via conduit 6 back to blender 7.

Material from holding bin 15 can be conveyed upon opening of valve 16 to a bagging or drum line, or to bulk container vehicle 18 upon opening of valve 17.

What is claimed is:

1. An apparatus suitable for removing water from aqueous sludge waste compositions which comprises a mixing and hopper arrangement for admixing aqueous sludge waste composition and dried solids to obtain a mixture and for conveying the mixture to a pelletizer via conduit means located between said mixing and hopper arrangement and said pelletizer;

pelletizer having an outlet and located adjacent said conduit means for receiving said mixture from said mixing and hopper arrangement and forming strands;

hot gas drier located beneath said pelletizer in the vicinity of the outlet of said pelletizer for removing water as vapor from said strands; storage means for receiving dried material exiting from said drier; and screw conveyor for conveying dried material exiting from said drier back to said mixing and hopper arrangement for mixing with aqueous sludge waste composition, wherein said screw conveyor is located adjacent said mixing and hopper arrangement and wherein said screw conveyor is at least about 25 feet long, and is inclined upwardly in the direction towards said mixing and hopper arrangement at an angle of about 27° to about 38°.

2. The apparatus of claim 1 wherein said angle is about 35°.

3. The apparatus of claim 1 which comprises at least two hot gas driers.

* * * * *